ns Patent [19] [11] 3,843,632
Matsuo et al. [45] Oct. 22, 1974

[54] OPTICAL BRIGHTENING AGENTS OF OXAZOLYL DERIVATIVES

[75] Inventors: Masatoshi Matsuo, Ibaragi; Tadao Sakaguchi, Osaka; Takashi Akamatsu, Ashiya, all of Japan

[73] Assignee: Sumitomo Chemical Company, Ltd., Higashi-ku, Osaka, Japan

[22] Filed: Oct. 12, 1970

[21] Appl. No.: 80,187

[30] Foreign Application Priority Data

| Oct. 21, 1969 | Japan | 44-83990 |
| Oct. 30, 1969 | Japan | 44-87461 |
| Oct. 30, 1969 | Japan | 44-87462 |
| Dec. 27, 1969 | Japan | 44-186770 |
| Dec. 27, 1969 | Japan | 44-1869 |
| Dec. 27, 1969 | Japan | 44-1870 |
| Dec. 27, 1969 | Japan | 44-1871 |
| Dec. 27, 1969 | Japan | 44-1872 |

[52] U.S. Cl. ... 260/240 CA, 117/33.5 R, 117/33.5 T, 252/301.2 W, 252/543, 260/37 NP, 260/41 B, 260/41 C, 260/240 D, 260/240 E, 260/240 J, 260/240 R, 260/240.1, 260/295 R, 260/296 R, 260/307 G, 260/307 R, 260/332.2 A, 260/347.3, 260/558 R
[51] Int. Cl. ............... C07d 85/44, C09b 23/100
[58] Field of Search ...... 260/240 CA, 307 R, 296 R

[56] References Cited
UNITED STATES PATENTS
| 3,148,194 | 9/1964 | Waugh et al. | 260/307 R |
| 3,546,217 | 12/1970 | Siegrist et al. | 260/240 CA |
| 3,732,221 | 5/1973 | Siegrist et al. | 260/240 B |

OTHER PUBLICATIONS
Bezuglyi et al., Zhur. Obsch. Khim. vol. 31, pp. 3160 to 3166 (1961).
Heinze et al., Chem. Ber. vol. 103, pp. 1572 to 1573 (1970).
Leggate et al., Molecular Crystals, vol. 4, pp. 357–373 (1968).
Walker et al., J. Heterocyclic Chemistry, vol. 1, pp. 72 to 73 (1964).
Chem. Abstracts, vol. 58, cols. 1995–1996 (abst. of Kleinerman), (1963).
Chem. Abstracts, vol. 58, col. 3998 (abst. of Nagornaya et al.), (1963).
Chemical Abstracts, 7th Collective Index (1962–1966), pp. 16,071S to 16075S (copyrighted 1970).
Chemical Abstracts, 8th Collective Index (1967–1971), pp. 21999S to 22005S (copyrighted 1973).
Karrer, Organic Chemistry, 2nd English Ed., frontispage and page 901, Elsevier Pub. Co. New York, (1946).
Netherlands Published Application No. 6615211, Ciba Ltd., pp. 1-9 and 22 cited (May 2, 1967).

*Primary Examiner*—John D. Randolph
*Attorney, Agent, or Firm*—Stevens, Davis, Miller & Mosher

[57] ABSTRACT

A novel oxazolyl derivative having the general formula:

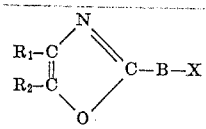

wherein each of $R_1$ and $R_2$ represents a hydrogen atom, an alkyl, a cycloalkyl, or an aryl group which may be substituted by alkyl or alkoxy groups or halogen atoms, or $R_1$ and $R_2$ may be linked each other to form a cycloalkyl group and may be the same or different; B represents a bivalent group; and X represents an oxazolyl group having the formula (II),

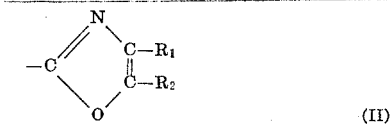

wherein $R_1$ and $R_2$ are the same as identified above, an aryloxazolyl group having the formula (III),

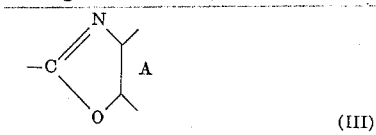

wherein A represents benzene or naphthalene nucleus which may be substituted by alkyl groups or halogen atoms, or when the bivalent group represented by B is

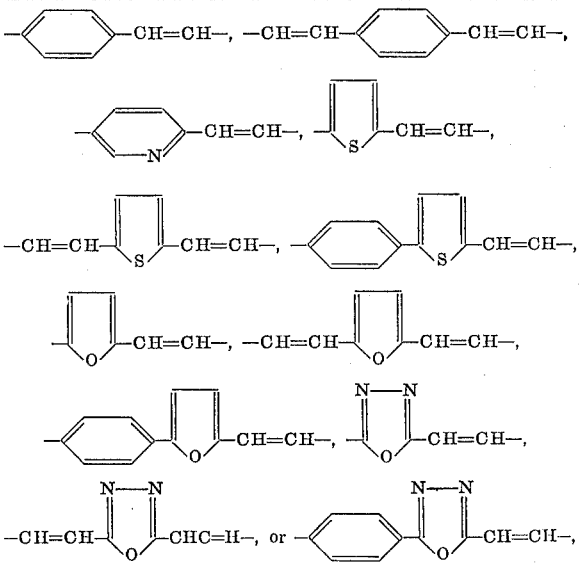

X represents the oxazolyl group having the formula (II), the aryloxazolyl group having the formula (III), or an aryl group having the formula (IV),

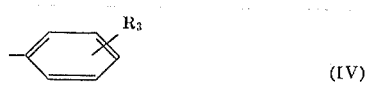

United States Patent [19]

Matsuo et al.

[11] 3,843,632

[45] Oct. 22, 1974

Wherein $R_3$ represents hydrogen or a halogen atom, a alkoxy, cyano, hydroxycarbonyl, an alkoxycarbonyl, a phenoxycarbonyl,

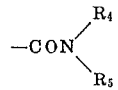

or $-NHCOR_6$ wherein each of $R_4$ and $R_5$ represents hydrogen atom or an alkyl group and $R_6$ represents an alkyl or a phenyl group, which is useful for brightening and whitening an organic polymer material.

4 Claims, No Drawings

OPTICAL BRIGHTENING AGENTS OF OXAZOLYL DERIVATIVES

This invention relates to optical brightening agents and to a method for preparing them.

This invention also relates to a method for optically brightening or whitening organic polymer materials.

This invention provides a novel oxazolyl derivative having the general formula:

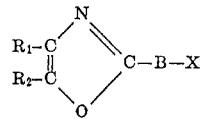

(I)

wherein each of $R_1$ and $R_2$ represents a hydrogen atom, an alkyl, a cycloalkyl, or an aryl group which may be substituted by alkyl or alkoxy groups or halogen atoms, or $R_1$ and $R_2$ may be linked each other to form a cycloalkyl group and may be the same or different; B represents a bivalent group; and X represents an oxazolyl group having the formula (II),

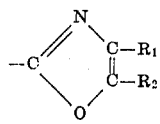

(II)

wherein $R_1$ and $R_2$ are the same as identified above, an aryloxazolyl group having the formula (III),

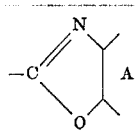

(III)

wherein A represents benzene or naphthalene nucleus which may be substituted by alkyl groups or halogen atoms, or when the bivalent group represented by B is

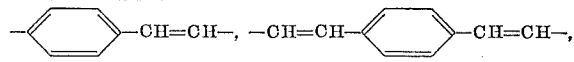

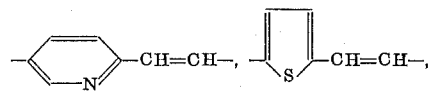

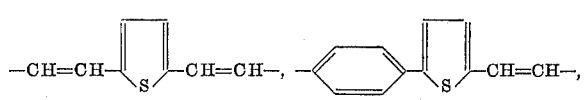

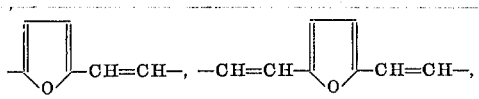

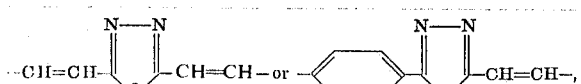

X represents the oxazolyl group having the formula (II), the aryloxazolyl group having the formula (III), or an aryl group having the formula (IV),

(IV)

wherein $R_3$ represents hydrogen or a halogen atom, an alkoxy, cyano, hydroxycarbonyl, an alkoxycarbonyl, a phenoxycarbonyl,

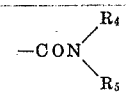

or $-NHCOR_6$ wherein each of $R_4$ and $R_5$ represents hydrogen atom or an alkyl group and $R_6$ represents an alkyl or a phenyl group.

This invention also provides a method for preparing the oxazolyl derivative having the formula (I), which comprises reacting an α-aminoketone having the formula (V),

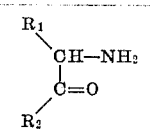

(V)

wherein $R_1$ and $R_2$ are the same as identified above, with an acid halide having the formula (VI),

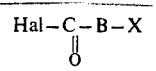

(VI)

wherein B and X are the same as identified above the Hal means a halogen atom, in the presence of a base, and ring-closing the resulting acid amide having the formula (VII),

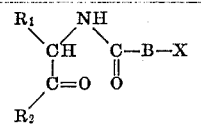

(VII)

wherein $R_1$, $R_2$, B and X are the same as identified above, in the presence of a dehydrating agent.

In addition, the oxazolyl derivative of the formula (I), in which B is

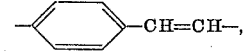

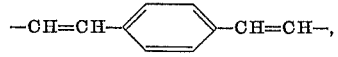

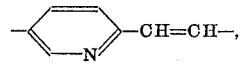

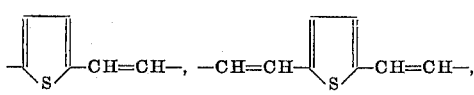

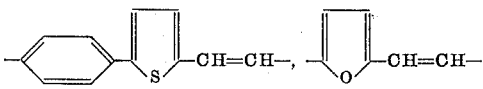

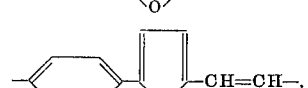

or and X is wherein $R_3$ is the same as identified above, may be prepared by reacting a p-tolyl derivative having the formula (VIII), (VIII)

wherein $R_1$ and $R_2$ are the same as identified above and Y is or with an anil derivative having the formula (IX), (IX)

wherein $R_3$ is the same as identified above, in the presence of a strong base in an aprotic polar solvent.

In the present invention, the "alkyl" and "alkoxy" mean an alkyl and alkoxy having 1 to 6 carbon atoms.

Examples of the bivalent group represented by B are or

The present invention will be explained in detail below.

In the reaction between the α-aminoketone (V) and the acid halide (VI), examples of the base include alkali bicarbonates such as sodium bicarbonate or potassium bicarbonate, alkali carbonates such as sodium carbonate or potassium carbonate, alkali hydroxides such as sodium hydroxide or potassium hydroxide, alkali acetates such as sodium acetate or potassium acetate, pyridine and its methyl derivatives, and trialkylamines such as triethylamine.

Suitable solvents may be used to make the reaction homogeneous. As the solvents, the following materials are useful: ethers such as diethyl ether, tetrahydrofuran, or dioxane, pyridine and its methyl derivatives, aprotic polar solvents such as dimethylfarmamide, dimethylacetamide or dimethylsulfoxide, and inactive organic solvents such as benzene, toluene, monochlorobenzene, chloroform, carbon tetrachloride, or dichloroethane.

The inactive organic solvents or ethers mentioned above are conveniently used when they are moistened or mixed with water. In this case, the α-aminoketones exist in an aqueous layer and the acid halides in an organic one; and the interfacial condensation may occur.

The reaction can be accomplished at a temperature between 20°C and 100°C and the time required is 0.5 – 8 hours.

In the ring-closure, examples of the dehydrating agents usable in the reaction are inorganic acids such as sulfuric acid, hydrochloric acid, phosphoric acid, or tripolyphosphoric acid, phosphor compounds such as phosphor pentaoxide, phosphor pentachloride, or phosphor oxychloride, and sulfur compounds such as thionyl chloride, or sulfuryl chloride.

The reaction can proceed easily at a temperature of 100°C or lower, and the time required is 0.5 – 8 hours.

In the reaction between the p-tolyl derivative (VIII) and the anil derivative (IX), examples of the strong base include alcoholates such as sodium methylate, sodium ethylate, potassium methylate, potassium ethylate, sodium t-butylate, potassium t-butylate or the like, and hydroxides such as sodium hydroxide, potassium hydroxide or the like. Examples of the aprotic polar solvents include dimethylformamide, diethylformamide, dimethylacetamide, hexamethylphosphoric triamide and the like.

A mixture of the p-tolyl derivative VIII and the anil derivative (IX) in the aprotic polar solvent in the presence of the base is heated to a temperature not lower than room temperature, preferably to 100°C. Although the reaction time depends on the reaction temperature and the kind and amount of the base, usually the reaction is completed within 5 hours. The amount of the anil derivative (IX) is 1.0 to 1.2 mol per mol of the tolyl derivative (VIII) and the amount of the base is not less than one mol per mol of the tolyl derivative (VIII).

The oxazolyl derivatives (I) thus obtained are insoluble in water and soluble in organic solvents such as o-dichlorobenzene or dimethylformamide, and show very strong fluorescence under an UV lamp or sun light.

According to this invention, the oxazolyl derivatives of formula I are very useful as optical brightening or whitening agents for organic polymer materials such as cotton, wool, cellulose acetates, polyesters, polyolefins, polystyrenes, polyvinyl chloride, polyvinylidene chloride, polyvinyl alcohol, polyacrylonitrile, polyacrylates, polyamides, polyurethanes, polycarbonates, ABS resins, alkyd resins, phenolic resins, or melamine resins. The organic polymer materials include fibrous materials and plastics. In application of the said derivatives (I) to the fibers or textiles of organic polymer materials mentioned above, they are preferably employed in an aqueous dispersion. More concretely, a said derivative (I) is dispersed in water and the fibers or textiles are immersed into the resulting aqueous dispersion and then the whole is heated. After the treatment ("disperse-dyeing" method), the derivative (I) is introduced into the fibers or textile materials, which are now optically brightened.

These derivatives (I) are also fixed onto the fibers or textile materials by the following method ("thermosol" method):

The fibers of textile materials are dipped in the same aqueous dispersion as in "disperse-dyeing" method to absorb a certain amount of the said dispersion, and then heated to above 100°C after the pre-drying.

By this procedure, said derivative (I) is thermofixed onto or introduced into the fibers or textiles.

These applications can be efficiently carried out by using additives such as surface-active agents, carriers, auxiliary agents, or the like and by also using oxidizing agents or bleaching agents.

These applications are also effective when combined with other treatments such as resin-finishing or dyeing.

According to this invention, the said derivatives (I) are very stable to heat and therefore can be incorporated into the melted organic polymers, which give, after spinning, the optically brightened fibers. This method is so-called "mass-coloration" or "dope-dyeing" method.

According to this invention, the said derivatives (I) can be used also for optically brightening or whitening plastics or resins by conventional techniques such as "dry-blend," "master-batch," or "coating" methods.

According to this invention, the said derivatives (I) can be added to a pre-polymer, alone or together with other additives, which gives an optically brightend polymer after polymerization or co-polymerization.

As mentioned above, the derivatives (I) of this invention are excellently effective as optical brightening agents for organic polymer materials and an amount of the derivatives (I) used, is very small, for example, when an organic polymer material contains 0.001 – 0.05 percent by weight of a said compound, it is sufficiently optically brightened or whitened to attain the purposes of this invention.

More useful results may be obtained if they are used in an amount larger than the above.

As stated above, the practice of this invention can be performed at any stages before or after molding.

The present invention will be explained by referring to the following examples, which are, of course, not to limit the scope of the invention. In the following examples, parts and percent are by weight, dimethylformamide is abbreviated to DMF and ethyl alcohol to EtOH.

PREPARATION OF THE OXAZOLYL
DERIVATIVE (I)

EXAMPLE 1

A hot solution containing 30.5 g of stilbene-4,4'-dicarboxylic acid chloride and 1200 ml of dioxane was added dropwise to a solution containing 27.2 g of α-methyl-α-aminoacetone hydrochloride prepared according to the method described in Halv. Chim. Acta, 33, 1217 – 26 (1950), and 600 ml of water while being vigorously stirred. During the addition of said solution, a 10 percent aqueous sodium carbonate solution was added also to adjust the pH to 7-8. The mixture was, thereafter, heated on a bath for one hour, and was cooled to deposit precipitates, which were separated by filtration, washed with a 10 percent aqueous sodium carbonate solution, further washed with water until the filtrate became neutral, and then dried. Thus, 31.3 g of 4,4'-bis [N-(α-acetylethyl)carbamoyl]stilbene having the formula,

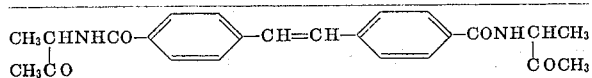

was obtained in the state of white crystalline powder. Yield: 77%, m.p.: 218°–220°C (decomposed)

| Elementary analysis | C (%) | H (%) | N(%) |
|---|---|---|---|
| Calculated (as $C_{24}H_{26}N_2O_4$) | 70.91 | 6.45 | 6.89 |
| Found | 70.51 | 6.30 | 6.98 |

40.6 Grams of the stilbene derivative obtained above was dissolved in 300 ml of concentrated sulfuric acid at a temperature of not higher than 30°C and the solution was stirred for 2 hours at 30°C and poured on 1.2l of ice water. The precipitates deposited were separated by filtration, washed with water until the filtrate became neutral, and dried. Thus, 25.9 g of 4,4'-bis(4,5-dimethyloxazol-2-yl) stilbene having the formula,

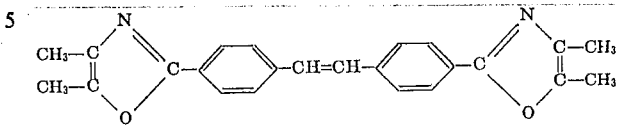

was obtained in the state of yellow crystalline powder. Yield: 70 percent, m.p.: 266° – 268°C (recrystallized from DMF hereinafter referred to as m.p. 266°– 268°C (DMF) in the following Examples).

| Elementary analysis | C (%) | H (%) | N (%) |
|---|---|---|---|
| Calculated (as $C_{24}H_{22}N_2O_2$) | 77.81 | 5.99 | 7.56 |
| Found | 77.54 | 6.03 | 7.55 |

The DMF solution of the product obtained exhibits blue strong fluorescence.

EXAMPLES 2–36

According to the method similar to that in Example 1, the following oxazolyl derivatives were obtained.

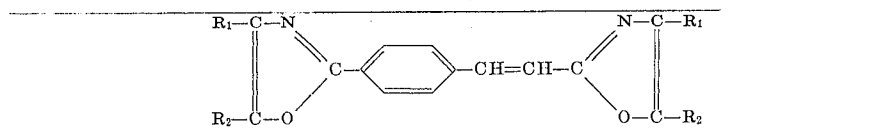

| Example number | $R_1$ | $R_2$ | M.P. (° C.) | Fluorescence in solvent |
|---|---|---|---|---|
| 2 | H— | $CH_3$— | 197-199 (DMF) | Blue (DMF) |
| 3 | $CH_3$— | $CH_3$— | 214-216 (DMF) | do (DMF) |
| 4 | H | $\begin{array}{c}CH_2-CH_2\\CH_2\phantom{xx}CH-\\CH_2-CH_2\end{array}$ | 173-175 (aq. DMF) | do (DMF) |
| 5 | | $CH_2CH_2-CH_2CH_2-$ | 202-204 (DMF) | do (DMF) |
| 6 | H— | ⌬ | 219-221 (DMF) | do (DMF) |
| 7 | $CH_3$— | Same as above | 214-216 (DMF) | do (DMF) |
| 8 | H— | Cl—⌬ | 224-228 (DMF) | Greenish blue (DMF) |
| 9 | H— | $CH_3$—⌬ | 222-223 (DMF) | Blue (DMF) |
| 10 | H— | $CH_3O$—⌬ | 235-236 (DMF) | Greenish blue (DMF) |
| 11 | | ⌬—⌬ | 241-242 (DMF) | do (DMF) |

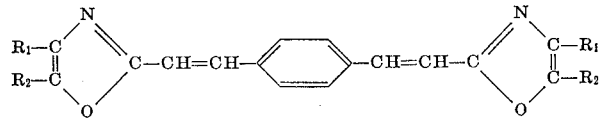

| Example number | $R_1$ | $R_2$ | M.P. (° C.) | Fluorescence in solvent |
|---|---|---|---|---|
| 12 | H— | $CH_3$— | 223-225 (DMF) | Blue (DMF) |
| 13 | $CH_3$— | $CH_3$— | 240-242 (DMF) | do (DMF) |
| 14 | H— | $\begin{array}{c}CH_2-CH_2\\CH_2\phantom{xx}CH-\\CH_2-CH_2\end{array}$ | 198-200 (EtOH) | do (DMF) |

| Example number | R₁ | R₂ | M.P. (° C.) | Fluorescence in solvent |
|---|---|---|---|---|
| 15 | | CH₂CH₂— CH₂CH₂— | 228–230 (EtOH) | Blue (DMF) |
| 16 | H— | ⌬ | 254–256 (DMF) | Greenish blue (DMF) |
| 17 | CH₃— | Same as above | 249–252 (DMF) | ...do... (DMF) |
| 18 | CH₃— | CH₃—⌬ | 252–254 (DMF) | ...do... (DMF) |
| 19 | H— | Cl—⌬ | 284–285 (DMF) | ...do... (DMF) |
| 20 | H— | CH₃—⌬ | 257–258 (DMF) | ...do... (DMF) |
| 21 | H— | CH₃O—⌬ | 270–271 (DMF) | ...do... (DMF) |
| 22 | ⌬ | ⌬ | 260–262 (DMF) | ...do... (DMF) |

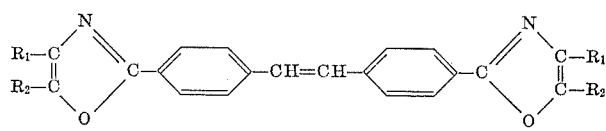

| Example number | R₁ | R₂ | M.P. (° C.) | Fluorescence in solvent |
|---|---|---|---|---|
| 23 | H— | CH₃— | 249–250 (DMF) | Blue (DMF) |
| 24 | H— | cyclohexyl | 225–227 (EtOH) | ...do... (DMF) |
| 25 | CH₃— | CH₃— | 266–268 (DMF) | ...do... (DMF) |
| 26 | CH₃CH₂— | CH₃— | 182–185 (DMF) | ...do... (DMF) |
| 27 | | CH₂CH₂— CH₂CH₂— | 254–256 (aq. DMF) | ...do... (DMF) |
| 28 | H— | ⌬ | 245–246 (DMF) | ...do... (DMF) |
| 29 | CH₃— | Same as above | 240–241 (DMF) | ...do... (DMF) |
| 30 | H— | Cl—⌬ | 276–277 (DMF) | Greenish blue (DMF) |
| 31 | H— | CH₃—⌬ | 248–249 (DMF) | Blue (DMF) |
| 32 | H— | CH₃O—⌬ | 261–262 (DMF) | Greenish blue (DMF) |
| 33 | CH₃— | Same as above | 256–257 (DMF) | ...do... (DMF) |
| 34 | ⌬ | ⌬ | 290–292 (DMF) | ...do... (DMF) |
| 35 | ⌬ | CH₃—⌬ | 279–280 (DMF) | ...do... (DMF) |
| 36 | H— | cyclohexyl | 225–227 (EtOH) | ...do... (DMF) |

EXAMPLE 37

A hot solution containing 27.9 g of biphenyl-4,4'-dicarboxylic acid chloride and 300 ml of dioxane was added dropwise to a solution containing 30.3 g of α-ethyl-α-aminoacetone hydrochloride prepared according to the same method as in Example 1, and 600 ml of water while being stirred vigorously. During the addition of said solution, a 10 percent aqueous sodium carbonate solution was added thereto to adjust the pH to 7–8. The mixture was, thereafter, heated for one hour on a bath, and was cooled to deposit precipitates, which were separated by filtration, washed with a 10 percent aqueous sodium carbonate solution, further washed with water until the filtrate became neutral, and dried. Thus, 29.4 g of 4,4'-[N-(α- acetyl-n-propyl)carbamoyl]biphenyl having the formula,

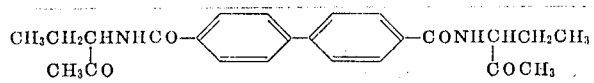

was obtained in the state of white crystalline powder. Yield: 72 percent, m.p.: 190° – 192°C.

Elementary analysis

|  | C (%) | H (%) | N (%) |
|---|---|---|---|
| Calculated (as $C_{24}H_{28}N_2O_4$) | 70.57 | 6.91 | 6.86 |
| Found | 70.51 | 6.80 | 6.98 |

40.8 Grams of the biphenyl derivative obtained above was dissolved in 300 ml of sulfuric acid at a temperature not higher than 30°C, and the solution was stirred for half an hour at 30°C and poured on 4.8l of ice water. The precipitates deposited were separated by filtration, washed with water until the filtrate became neutral, and dried. Thus, 35.0 g of 4,4'-bis(4-ethyl-5-methyloxazol-2-yl)biphenyl having the formula,

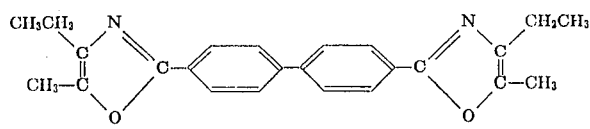

was obtained in the state of light yellow crystalline powder. Yield: 94 percent, m.p.: 175° – 177°C (DMF).

Elementary analysis

|  | C (%) | H (%) | N (%) |
|---|---|---|---|
| Calculated (as $C_{24}H_{24}N_2O_2$) | 77.39 | 6.50 | 7.52 |
| Found | 77.54 | 6.43 | 7.55 |

The DMF solution of the product obtained exhibits violet blue strong fluroescence.

EXAMPLES 38–73

According to the method similar to that of Example 37, the following oxazolyl derivatives were obtained.

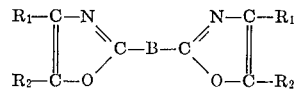

| Example number | $R_1$ | $R_2$ | B | M.P. (° C.) | Fluorescence in solvent |
|---|---|---|---|---|---|
| 38 | H— | $CH_3$— | biphenyl | 242–243 (EtOH) | Violet blue (EtOH) |
| 39 | H— | $CH_3$— | naphthalene | 142–144 (EtOH) | do (EtOH) |
| 40 | H— | $CH_3$— | naphthalene | 255–257 (DMF) | do (EtOH) |
| 41 | $CH_3$— | $CH_3$— | biphenyl | 253–254 (DMF) | do (EtOH) |
| 42 | $CH_3$— | $CH_3$— | naphthalene | 266–268 (DMF) | do (EtOH) |
| 43 | $CH_3$— | $CH_3$— | naphthalene | 258–260 (DMF) | do (EtOH) |
| 44 | $CH_3CH_2$— | $CH_3$— | biphenyl | 175–177 (DMF) | do (EtOH) |
| 45 | $CH_3CH_2$— | $CH_3$— | naphthalene | 162–164 (DMF) | do (EtOH) |
| 46 | $CH_2CH_2$— $CH_2CH_2$— (joined) | | biphenyl | 151–153 (EtOH) | do (EtOH) |
| 47 | H— | cyclohexyl ($CH_2$-$CH_2$, $CH_2$, $CH_2$-$CH_2$, CH–) | Same as above | 127–129 (EtOH) | do (EtOH) |

| Example number | R₁ | R₂ | B | M.P. (° C.) | Fluorescence in solvent |
|---|---|---|---|---|---|
| 48 | H— | Same as above | 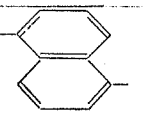 | 114–115 (EtOH) | Violet blue (EtOH) |
| 49 | H— |  | 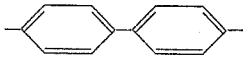 | 220–222 (DMF) | Blue (EtOH) |
| 50 | H— | Same as above | 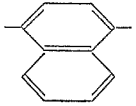 | 167–169 (aq. DMF) | ...do... (EtOH) |
| 51 | H— | ...do... | 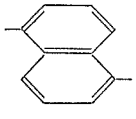 | 257–260 (DMF) | ...do... (EtOH) |
| 52 | H— | ...do... | 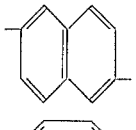 | 227–229 (DMF) | ...do... (EtOH) |
| 53 | H— | Cl— | 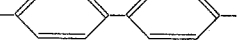 | 275–277 (DMF) | ...do... (EtOH) |
| 54 | H— | Same as above | 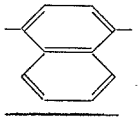 | 225–227 (DMF) | ...do... (EtOH) |
| 55 | H— | ...do... | 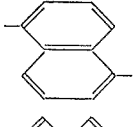 | >300 (DMF) | ...do... (EtOH) |
| 56 | H— | ...do... | 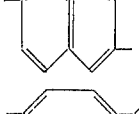 | 283–284 (DMF) | ...do... (EtOH) |
| 57 | H— | CH₃— | 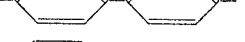 | 223–225 (DMF) | ...do... (EtOH) |
| 58 | H— | CH₃—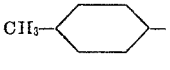 | 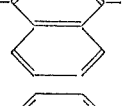 | 170–171 (EtOH) | ...do... (EtOH) |
| 59 | { H— <br> H— } | CH₃O—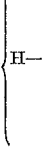 <br> Same as above | 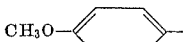 <br> 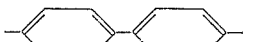 | 283–285 (DMF) <br> >300 (DMF) | ...do... (EtOH) <br> ...do... (EtOH) |
| 60 | H— | ...do... | 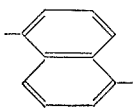 | >300 (DMF) | ...do... (EtOH) |
| 61 | CH₃— | 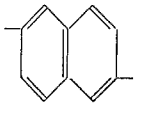 | 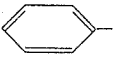 | 215–216 (DMF) | ...do... (EtOH) |
| 62 | CH₃— | Same as above | 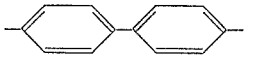 | 162–163 (EtOH) | ...do... (EtOH) |
| 63 | 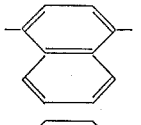 | ...do... | 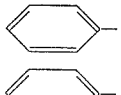 | 287–289 (DMF) | Greenish blue (EtOH) |
| 64 | 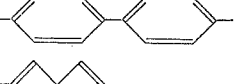 | ...do... | 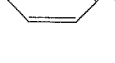 | 272–274 (DMF) | ...do... (EtOH) |

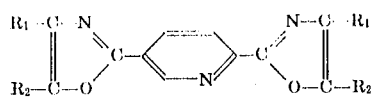

| Example number | R₁ | R₂ | M.P. (° C.) | | Fluorescence in solvent | |
|---|---|---|---|---|---|---|
| 65 | H— | CH₃— | 248–249 | (aq. EtOH) | Violet blue | (EtOH) |
| 66 | CH₃— | CH₃— | 265–266 | (aq. EtOH) | do | (EtOH) |
| 67 | H— | (cyclohexyl) | 198–200 | (aq. EtOH) | do | (EtOH) |
| 68 | H— | C₆H₅— | 249–251 | (DMF) | do | (EtOH) |
| 69 | H— | Cl–C₆H₄— | 280–281 | (DMF) | Blue | (EtOH) |
| 70 | H— | CH₃O–C₆H₄— | >300 | (DMF) | do | (EtOH) |
| 71 | CH₃— | C₆H₅— | 245–246 | (DMF) | do | (EtPH) |
| 72 | C₆H₅— | Same as above | >300 | (DMF) | do | (EtOH) |
| 73 | C₆H₅— | CH₃–C₆H₄— | >300 | (DMF) | do | (EtOH) |

EXAMPLE 74

According to the method similar to that of Example 1, 34.7 g. of 1,3,4-oxadiazole-2,5-dicarboxylic acid dichloride was condensed with 37.6 g of β-aminoacetophenone hydrochloride to give 48.7 g of 1,3,4-oxadiazole-2,5-dicarbonyl-N-(α-benzoylmethyl) amide having the following formula,

Yield: 89.5 percent, m.p.: 266° – 268°C.

Elementary analysis

| | C (%) | H (%) | N (%) |
|---|---|---|---|
| Calculated (as $C_{32}H_{24}N_4O_5$) | 70.58 | 4.44 | 10.29 |
| Found | 70.77 | 4.81 | 10.57 |

54.5 Grams of 1,3,4-oxadiazole-2,5-dicarbonyl-N-(α-benzoyl-methyl)amide thus obtained was dehydrated as in Example 1, to obtain 46.3 g of 2,5-bis[p-(5-phenyloxazol-2-yl)phenyl]-1,3,4-oxadiazole having the following formula,

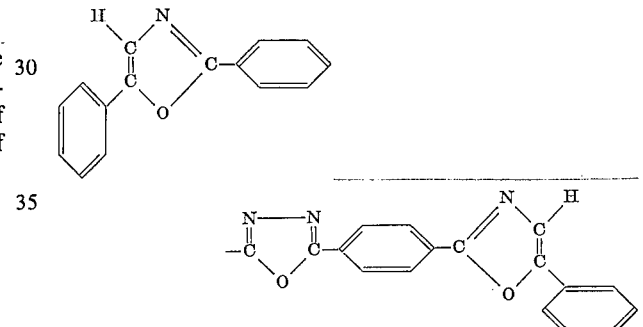

Yield: 91.0 percent, m.p.: > 300°C (DMF).

Elementary analysis

| | C (%) | H (%) | N (%) |
|---|---|---|---|
| Calculated (as $C_{32}H_{20}N_4O_3$) | 75.58 | 3.96 | 11.02 |
| Found | 75.67 | 3.98 | 10.97 |

The DMF solution of the product obtained exhibits very strong glue fluorescence.

EXAMPLES 75–108

According to the method similar to that of Example 74, the following oxazolyl derivatives were obtained.

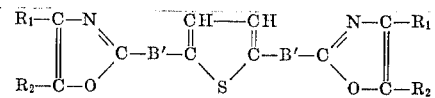

| Example number | R₁ | R₂ | B' | M.P. (° C.) | Fluorescence in solvent |
|---|---|---|---|---|---|
| 75 | H— | CH₃— |  | 137–138 (Aq. EtOH) | Violet blue (DMF) |
| 76 | H— | CH₃— | —⟨phenyl⟩— | 175–176 (EtOH) | Blue (DMF) |
| 77 | CH₃— | CH₃— |  | 154–155 (Aq. EtOH) | Violet blue (DMF) |
| 78 | H— | cyclohexyl (CH₂–CH₂/CH₂–CH₂/CH) | —CH=CH— | 128–130 (EtOH) | Blue (DMF) |
| 79 | H— | ⟨phenyl⟩ |  | 138–140 (EtOH) | ...do... (DMF) |
| 80 | H— | Same as above | —⟨phenyl⟩— | 177–179 (EtOH) | Greenish blue (DMF) |
| 81 | H— | Cl—⟨phenyl⟩— | —CH=CH— | 184–186 (DMF) | ...do... (DMF) |
| 82 | H— | CH₃O—⟨phenyl⟩— |  | 154–156 (EtOH) | Blue (DMF) |
| 83 | CH₃— | ⟨phenyl⟩ | —⟨phenyl⟩— | 172–174 (EtOH) | Greenish blue (DMF) |
| 84 | ⟨phenyl⟩ | Same as above |  | 199–200 (DMF) | Blue (DMF) |
| 85 | Same as above | do | —⟨phenyl⟩— | 237–239 (DMF) | ...do... (DMF) |

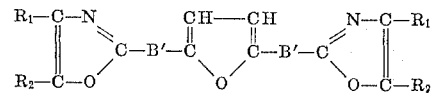

| Example No. | R₁ | R₂ | B' | M.P. (° C.) | Fluorescence in solvent |
|---|---|---|---|---|---|
| 86 | H— | CH₃— | —⟨phenyl⟩— | 209–211 (EtOH) | Blue (EtOH) |
| 87 | CH₃— | CH₃— | Same as above | 226–228 (EtOH) | ...do... (EtOH) |
| 88 | CH₃— | CH₃— | —CH=CH— | 203–204 (EtOH) | ...do... (EtOH) |
| 89 | H— | cyclohexyl (CH₂–CH₂/CH₂/CH₂–CH₂/CH) | —⟨phenyl⟩— | 149–151 (EtOH) | ...do... (EtOH) |
| 90 | H— | ⟨phenyl⟩ | Same as above | 211–212 (DMF) | Greenish blue (EtOH) |
| 91 | H— | Same as above | —CH=CH— | 187–189 (DMF) | ...do... (EtOH) |
| 92 | H— | Cl—⟨phenyl⟩— | —⟨phenyl⟩— | 242–244 (DMF) | ...do... (EtOH) |
| 93 | CH₃— |  | Same as above | 215–217 (DMF) | ...do... (EtOH) |
| 94 | ⟨phenyl⟩ | Same as above | do | 271–272 (DMF) | ...do... (EtOH) |
| 95 | Same as above | do | —CH=CH— | 248–249 (DMF) | ...do... (EtOH) |

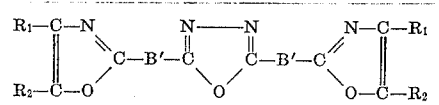

| Example No. | R₁ | R₂ | B' | M.P. (° C.) | Fluorescence in solvent |
|---|---|---|---|---|---|
| 96 | H— | CH₃— |  | 265–267 (EtOH) | Violet blue (DMF) |
| 97 | CH₃— | CH₃— |  | 282–285 (EtOH) | ...do... (DMF) |
| 98 | CH₃CH₂— | CH₃— | —⟨phenyl⟩— | 256–257 (DMF) | ...do... (DMF) |

| Example No. | R₁ | R₂ | B' | M.P. (° C.) | Fluorescence in solvent |
|---|---|---|---|---|---|
| 99 | CH₃— | CH₃— | —CH=CH— | 297–300 (DMF) | Blue (DMF) |
| 100 | H— | CH₂—CH₂ / CH₂ \ CH— \ CH₂—CH₂ | ⌬ (phenyl) | 202–204 (EtOH) | ....do.... (DMF) |
| 101 | H— | ⌬ (cyclohexyl) | ⌬ | 277–279 (DMF) | ....do.... (DMF) |
| 102 | H— | Same as above | ⌬ | >300 (DMF) | Greenish blue (DMF) |
| 103 | H— | Cl—⌬— | —CH=CH— | >300 (DMF) | ....do.... (DMF) |
| 104 | H— | Same as above | ⌬ | >300 (DMF) | ....do.... |
| 105 | H— | CH₃O—⌬— | Same as above | >300 (DMF) | ....do.... (DMF) |
| 106 | CH₃— | ⌬ | ....do.... | >300 (DMF) | ....do.... |
| 107 | ⌬ | Same as above | | >300 (DMF) | Blue (DMF) |
| 108 | Same as above | CH₃—⌬— | —CH=CH— | >300 (DMF) | Greenish blue (DMF) |

EXAMPLE 109

A mixture of 20.8 g of β-(benzoxazol-2-yl)-acrylic acid chloride obtained according to the conventional method and 20.8 g of α-amino-p-chloroacetophenone in 200 ml of dimethylformamide was heated to 50° – 60°C on a bath and 45 g of triethylamine was added dropwise thereto while being stirred vigorously. The mixture was, thereafter, kept at 70° – 80°C for 2 hours and allowed to stand. After cooling, the reaction mixture was poured in 500 ml of water to deposit precipitates, which were separated by filtration, washed with water and dried. Thus, 26.6 g of β-(benzoxazol-2-yl)acrylamide having the formula,

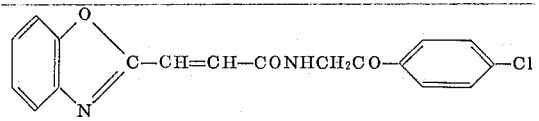

was obtained in the state of light-brown crystalline powder. Yield: 78 percent, m.p.: 215° – 217°C.

Elementary analysis

| | C (%) | H (%) | N (%) |
|---|---|---|---|
| Calculated (as C₁₈H₁₃N₂O₃) | 63.44 | 3.85 | 8.22 |
| Found | 63.21 | 3.92 | 8.07 |

34.1 Grams of the acrylamide derivative obtained above was dissolved in 150 g of polyphosphoric acid kept at 100°C while being stirred. The temperature was elevated to 130° – 140°C and the mixture was kept for one hour at the same level temperature. After cooling to a temperature not higher than 100°C, the reaction mixture was poured in 300 g of ice water and the resulting mixture was stirred for about one hour. The precipitates deposited were separated by filtration, washed with water until the filtrate became neutral, and dried. Thus, 28.1 g of the compound having the formula,

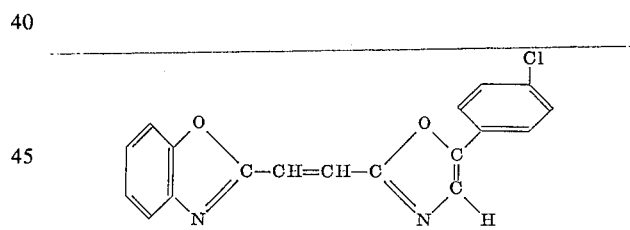

was obtained in the state of yellow crystalline powder. Yield: 87 percent, m.p.: 176° – 177°C (ethanol).

Elementary analysis

| | C (%) | H (%) | N (%) |
|---|---|---|---|
| Calculated (as C₁₈H₁₁N₂O₂Cl) | 66.98 | 3.44 | 8.68 |
| Found | 66.79 | 3.51 | 8.71 |

The ethanol, benzene and DMF solutions of the product obtained exhibit blue strong fluorescence.

EXAMPLES 110–221

According to the method similar to that of Example 109, the following oxazolyl derivatives were obtained.

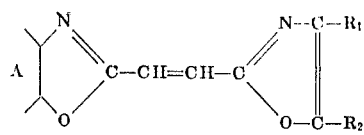

| Example No. | R₁ | R₂ | A | M.P. (° C.) | Fluorescence in solvent |
|---|---|---|---|---|---|
| 110 | H— | CH₃— | CH₃–(phenyl)– | 132–134 (Aq. EtOH) | Blue violet (EtOH) |
| 111 | CH₃— | CH₃— | (phenyl)– | 142–143 (Aq. EtOH) | do (EtOH) |
| 112 | CH₃— | CH₃— | Cl–(phenyl)– | 162–163 (Aq. EtOH) | do (EtOH) |
| 113 | —CH₂CH₂— | —CH₂CH₂— | Same as above | 147–148 (Aq. EtOH) | do (EtOH) |
| 114 | —CH₂CH₂— | —CH₂CH₂— | CH₃–(phenyl)– | 97–100 (Aq. EtOH) | do (EtOH) |
| 115 | H— | cyclohexyl (CH₂–CH₂–CH–CH₂–CH₂–CH₂) | (phenyl)– | 101–103 (Aq. EtOH) | do (EtOH) |
| 116 | H— | (phenyl) | CH₃–(phenyl)– | 148–150 (EtOH) | do (EtOH) |
| 117 | H— | Same as above | (phenyl)– | 143–145 (Aq. EtOH) | do (EtOH) |
| 118 | H— | do | CH₃O–(phenyl)– | 161–163 (EtOH) | Greenish blue (EtOH) |
| 119 | H— | do | Cl–(phenyl)– | 170–172 (EtOH) | do (EtOH) |
| 120 | H— | Cl–(phenyl)– | (phenyl)– | 176–177 (EtOH) | Blue (EtOH) |
| 121 | H— | CH₃–(phenyl)– | Same as above | 146–148 (Aq. EtOH) | Blue violet (EtOH) |
| 122 | H— | CH₃O–(phenyl)– | do | 159–161 (EtOH) | Greenish blue (EtOH) |
| 123 | CH₃— | (phenyl)– | Cl–(phenyl)– | 165–167 (EtOH) | Blue (EtOH) |
| 124 | CH₃— | CH₃–(phenyl)– | Same as above | 168–170 (EtOH) | do (EtOH) |
| 125 | (phenyl) | (phenyl)– | CH₃–(phenyl)– | 168–170 (EtOH) | do (EtOH) |

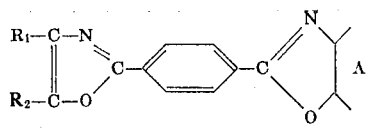

| Example No. | R₁ | R₂ | A | M.P. (° C.) | Fluorescence in solvent |
|---|---|---|---|---|---|
| 126 | H— | CH₃— | phenyl | 189-190 (DMF) | Violet blue (EtOH) |
| 127 | CH₃— | CH₃— | Cl-phenyl | 211-213 (DMF) | ...do... (EtOH) |
| 128 | CH₃— | CH₃— | naphthyl | 196-197 (DMF) | ...do... (EtOH) |
| 129 | H— | cyclohexyl (CH₂—CH₂, CH₂—CH₂, CH₂—CH—) | phenyl | 173-175 (EtOH) | ...do... (EtOH) |
| 130 | H— | phenyl | CH₃-phenyl | 190-191 (DMF) | Blue (EtOH) |
| 131 | H— | Cl-C₆H₄— | Same as above | 200-202 (DMF) | ...do... (EtOH) |
| 132 | H— | CH₃O-C₆H₄— | naphthyl | 225-227 (DMF) | ...do... (EtOH) |
| 133 | CH₃— | phenyl | naphthyl | 188-190 (DMF) | ...do... (EtOH) |
| 134 | H— | Same as above | Cl-phenyl | 250-255 (DMF) | ...do... (EtOH) |
| 135 | Same as above | CH₃-C₆H₄— | Same as above | 253-255 (DMF) | ...do... (EtOH) |

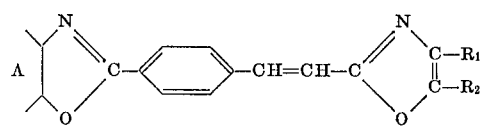

| Example Number | R₁ | R₂ | A | M.P. (° C.) | Fluorescence in solvent |
|---|---|---|---|---|---|
| 136 | CH₃— | CH₃— | phenyl | 161-163 (DMF) | Violet blue (DMF) |
| 137 | H— | Cl— | CH₃-phenyl | 174-175 (DMF) | Greenish blue (DMF) |

| Example No. | R₁ | R₂ | A | M.P. (° C.) | Fluorescence in solvent |
|---|---|---|---|---|---|
| 138 | H— | phenyl | 2-Cl-phenyl | 190–192 (DMF) | Blue (DMF) |
| 139 | | phenyl | Same as above | Same as above | 197–200 (DMF) | Greenish blue (DMF) |
| 140 | CH₃— | CH₃— | naphthyl | 185–186 (Aq. DMF) | Blue (DMF) |

| Example No. | R₁ | R₂ | A | M.P. (° C.) | Fluorescence in solvent |
|---|---|---|---|---|---|
| 141 | H— | CH₃— | naphthyl | 168–170 (Aq. DMF) | Blue (DMF) |
| 142 | CH₃— | CH₃— | 2-Cl-phenyl | 201–202 (DMF) | Violet blue (DMF) |
| 143 | CH₃— | CH₃— | 2-CH₃-phenyl | 122–124 (EtOH) | do (DMF) |
| 144 | H— | cyclohexyl (—CH₂CH₂CH₂CH₂CH₂CH—) | phenyl | 144–147 (EtOH) | do (DMF) |
| 145 | H— | phenyl | 2-CH₃-phenyl | 169–170 (DMF) | Blue (DMF) |
| 146 | H— | 4-Cl-phenyl | phenyl | 233–235 (DMF) | Greenish blue (DMF) |

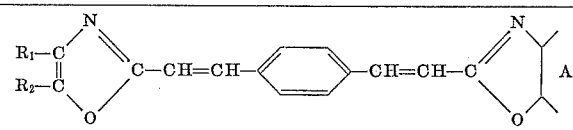

| Example No. | R₁ | R₂ | A | M.P. (° C.) | Fluorescence in solvent |
|---|---|---|---|---|---|
| 147 | H— | CH₃— | phenyl | 181–182 (Aq. DMF) | Blue (DMF) |
| 148 | CH₃— | CH₃— | 2-Cl-phenyl | 200–202 (Aq. DMF) | do (DMF) |

| Example No. | R₁ | R₂ | A | M.P. (° C.) | Fluorescence in solvent |
|---|---|---|---|---|---|
| 149 | CH₃— | CH₃— | naphthyl | 195–197 (Aq. DMF) | Blue (DMF) |
| 150 | H— | cyclohexyl | phenyl | 172–175 (EtOH) | do (DMF) |
| 151 | H— | phenyl | CH₃-phenyl | 200–201 (DMF) | Greenish blue (DMF) |
| 152 | H— | Same as above | Cl-phenyl | 208–210 (DMF) | do (DMF) |
| 153 | H— | Cl-phenyl- | naphthyl | 210–211 (DMF) | do (DMF) |
| 154 | CH₃— | phenyl | CH₃-phenyl | 200–202 (Aq. DMF) | do (DMF) |
| 155 | phenyl | Same as above | phenyl | 190–191 (DMF) | do (DMF) |
| 156 | Same as above | CH₃-phenyl- | Cl-phenyl | 216–217 (DMF) | do (DMF) |

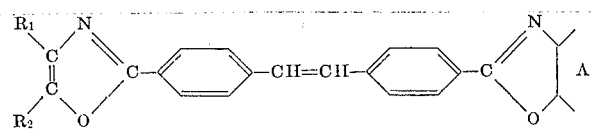

| Example No. | R₁ | R₂ | A | M.P. (° C.) | Fluorescence in solvent |
|---|---|---|---|---|---|
| 157 | H— | CH₃— | Cl-phenyl | 214–216 (DMF) | Blue (DMF) |
| 158 | CH₃— | CH₃— | phenyl | 218–220 (Aq. DMF) | do (DMF) |
| 159 | CH₃— | CH₃— | naphthyl | 208–209 (EtOH) | do (DMF) |
| 160 | H— | cyclohexyl | phenyl | 179–181 (EtOH) | do (DMF) |

| Example No. | R₁ | R₂ | A | M.P. (° C.) | Fluorescence in solvent |
|---|---|---|---|---|---|
| 161 | H— |  | 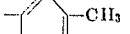—CH₃ | 201–202 (DMF) | Greenish blue (DMF) |
| 162 | H— | Same as above | 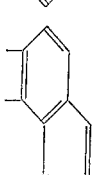 | 203–205 (DMF) | do (DMF) |
| 163 | H— | Cl—— | —CH₃ | 232–235 (DMF) | do (DMF) |
| 164 | CH₃— | — | 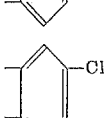—Cl | 211–212 (DMF) | do (DMF) |
| 165 |  | Same as above |  | 242–244 (DMF) | do (DMF) |
| 166 | Same as above | CH₃—— | —Cl | 224–225 (DMF) | do (DMF) |
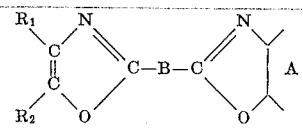
| Ex. No. | R₁ | R₂ | B | A | M.P. (° C.) | Fluorescence in solvent |
|---|---|---|---|---|---|---|
| 167 | H— | CH₃— |  |  | 191–193 (DMF) | Violet blue (EtOH) |
| 168 | CH₃— | CH₃— |  | 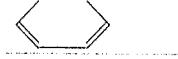—Cl | 166–167 (EtOH) | do (EtOH) |
| 169 | CH₃— | CH₃— |  | 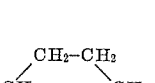 | 203–204 (DMF) | do (EtOH) |
| 170 | H— |  |  |  | 162–165 (EtOH) | Blue (EtOH) |
| 171 | H— |  |  | 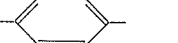—CH₃ | 144–145 (EtOH) | do (EtOH) |
| 172 | H— | Same as above |  | | 192–193 (DMF) | do (EtOH) |

| Ex. No. | R₁ | R₂ | B | A | M.P. (°C.) | Fluorescence in solvent |
|---|---|---|---|---|---|---|
| 173 | H— | Cl—⌬— | —⌬—⌬— | naphthyl | 226–227 (DMF) | Blue (EtOH) |
| 174 | H— | CH₃O—⌬— | naphthyl | —⌬—Cl | 236–237 (DMF) | ...do... (EtOH) |
| 175 | CH₃— | —⌬— | naphthyl | —⌬—CH₃ | 148–150 (Aq. DMF) | ...do... (EtOH) |
| 176 | —⌬— | Same as above | —⌬—⌬— | —⌬—Cl | 215–216 (DMF) | Greenish blue (EtOH) |
| 177 | Same as above. | CH₃—⌬— | naphthyl | naphthyl | 158–160 (DMF) | ...do... (EtOH) |

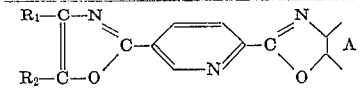

| Example No. | R₁ | R₂ | A | M.P. (°C.) | Fluorescence in solvent |
|---|---|---|---|---|---|
| 178 | H— | CH₃— | phenyl | 214–216 (EtOH) | Violet (EtOH) |
| 179 | CH₃— | CH₃— | —⌬—Cl | 236–237 (EtOH) | Violet blue (EtOH) |
| 180 | CH₃— | CH₃— | naphthyl | 215–217 (EtOH) | ...do... (EtOH) |
| 181 | H— | cyclohexyl (CH₂–CH₂/CH₂–CH₂/CH₂–CH—) | phenyl | 187–189 (Aq. DMF) | ...do... (EtOH) |
| 182 | H— | —⌬— | —⌬—CH₃ | 210–212 (DMF) | Blue (EtOH) |
| 183 | H— | Same as above | naphthyl | 212–215 (DMF) | ...do... (EtOH) |
| 184 | H— | Cl—⌬— | naphthyl | 225–226 (DMF) | ...do... (EtOH) |

| Example No. | R₁ | R₂ | A | M.P. (° C.) | Fluorescence in solvent |
|---|---|---|---|---|---|
| 185 | H— | CH₃O—C₆H₄— | —C₆H₄—Cl | 248–250 (DMF) | Blue (EtOH) |
| 186 | CH₃— | C₆H₅— | —C₆H₄—CH₃ | 208–210 (EtOH) | ....do.... (EtOH) |
| 187 | C₆H₅— | Same as above | —C₆H₄—Cl | 255–256 (DMF) | ....do.... (EtOH) |
| 188 | Same as above | CH₃—C₆H₄— | —C₆H₄—CH₃ | 235–237 (DMF) | ....do.... (EtOH) |

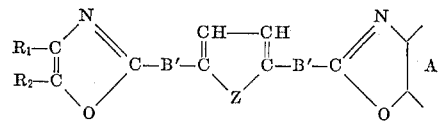

| Example No. | R₁ | R₂ | B' | Z | A | M.P. (° C.) | Fluorescence in solvent |
|---|---|---|---|---|---|---|---|
| 189 | H— | CH₃— | | S | C₆H₅— | 119–120 (EtOH) | Violet blue (DMF) |
| 190 | H— | CH₃— | | S | —C₆H₄—Cl | 136–138 (EtOH) | ....do.... (DMF) |
| 191 | CH₃— | CH₃— | | S | —C₆H₄—CH₃ | 138–139 (Aq. EtOH) | ....do.... (DMF) |
| 192 | CH₃— | CH₃— | | S | —C₆H₄—Cl | 142–143 (EtOH) | ....do.... (DMF) |
| 193 | CH₃— | CH₃— | —C₆H₄— | S | | 163–165 (EtOH) | Blue (DMF) |
| 194 | H— | cyclohexyl (CH₂–CH₂–CH₂–CH₂–CH₂–CH—) | | S | naphthyl | 109–110 (Aq. EtOH) | Violet blue (DMF) |
| 195 | H— | C₆H₅— | | S | —C₆H₄—CH₃ | 133–135 (DMF) | Blue (DMF) |
| 196 | H— | Same as above | —C₆H₄— | S | —C₆H₄—CH₃ | 160–163 (DMF) | Greenish blue (DMF) |
| 197 | H— | do | Same as above | S | —C₆H₄—Cl | 158–160 (DMF) | ....do.... (DMF) |

| Example No. | R₁ | R₂ | B' | Z | A | M.P. (°C.) | | Fluorescence in solvent | |
|---|---|---|---|---|---|---|---|---|---|
| 198 | H— | do | —CH=CH— | S | 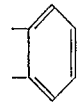 | 136–137 | (DMF) | Greenish blue | (DMF) |
| 199 | H— | Cl— | —CH=CH— | S | Same as above | 145–146 | (DMF) | do | (DMF) |
| 200 | H— | CH₃O— | | S | 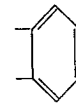 | 142–145 | (DMF) | Blue | (DMF) |
| 201 | 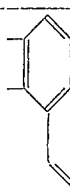 | 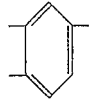 | | S | 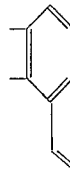 | 153–155 | (DMF) | do | (DMF) |
| 202 | H— | CH₃— | | O | 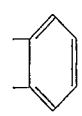 | 165–166 | (Aq. EtOH) | Violet blue | (DMF) |
| 203 | CH₃— | CH₃— | | O | 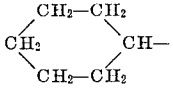 | 168–170 | (EtOH) | do | (DMF) |
| 204 | CH₃— | CH₃— | 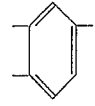 | O | 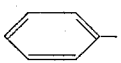 | 192–193 | (EtOH) | Blue | (DMF) |
| 205 | H— | 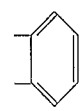 | | O |  | 87–90 | (Aq. EtOH) | Violet blue | (DMF) |
| 206 | H— | 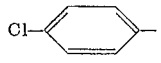 | | O | 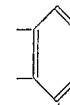 | 181–182 | (DMF) | Blue | (DMF) |
| 207 | H— | Same as above | —CH=CH— | O | 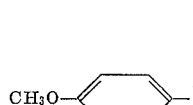 | 146–147 | (EtOH) | Greenish blue | (DMF) |
| 208 | H— | 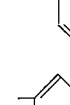 | 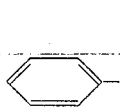 | O | 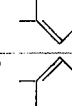 | 173–175 | (DMF) | do | (DMF) |
| 209 | H— | CH₃O—⌬— | | O | 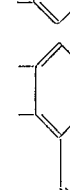 | 177–180 | (DMF) | Blue | (DMF) |
| 210 | CH₃— | ⌬— | —CH=CH— | O | | 160–161 | (EtOH) | Greenish blue | (DMF) |
| 211 | ⌬— | Same as above | | O | | 182–185 | (DMF) | Blue | (DMF) |

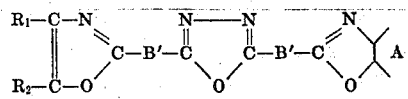

| Example No. | R₁ | R₂ | B' | A | M.P. (° C.) | Fluorescence in solvent |
|---|---|---|---|---|---|---|
| 212 | H— | CH₃— | | phenyl | 213–215 (EtOH) | Violet blue (DMF) |
| 213 | CH₃— | CH₃— | | naphthyl | 214–216 (EtOH) | do (DMF) |
| 214 | CH₃— | CH₃— | phenyl | phenyl | 268–270 (DMF) | Blue (DMF) |
| 215 | H— | cyclohexyl (CH₂–CH₂–CH₂–CH₂–CH—) | | phenyl-Cl | 196–198 (EtOH) | Violet blue (DMF) |
| 216 | H— | phenyl | | phenyl-CH₃ | 212–213 (DMF) | Blue (DMF) |
| 217 | H— | Same as above | phenyl | phenyl | 267–268 (DMF) | Greenish blue (DMF) |
| 218 | H— | Cl-phenyl | | phenyl-CH₃ | 224–225 (DMF) | Blue (DMF) |
| 219 | CH₃— | phenyl | —CH=CH— | phenyl | 241–242 (DMF) | Greenish blue (DMF) |
| 220 | phenyl | Same as above | phenyl | phenyl-Cl | >300 (DMF) | do (DMF) |
| 221 | Same as above | CH₃-phenyl | —CH=CH— | naphthyl | 240–242 (DMF) | do (DMF) |

EXAMPLE 222

A hot solution containing 31.4 g of 4'-dimethylaminocarbonylstilbene-4-carboxylic acid chloride (m.p. 220° – 222°C) and 1200 ml of dioxane was added dropwise to a solution containing 14.8 g of α-methyl-α-aminoacetone hydrochloride and 600 ml of water while being stirred vigorously. During the addition of said solution, a 10 percent aqueous sodium acetate solution was added thereto to adjust the pH to 7–8. The mixture was, thereafter, heated on a bath for about one hour and allowed to stand. After cooling, the reaction mixture was subjected to filtration to separate precipitates, which were washed with a 10 percent aqueous sodium acetate solution, further washed with water until the filtrate became neutral and dried. Thus, 31.2 g of the stilbene derivative having the formula,

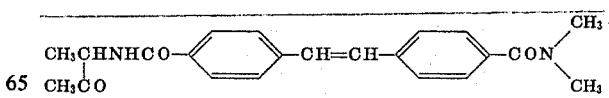

was obtained in the state of white crystalline powder. Yield: 85.6 percent, m.p.: 236° – 239°C.

| Elementary analysis | C (%) | H (%) | N (%) |
|---|---|---|---|
| Calculated (as $C_{22}H_{24}N_2O_3$) | 72.50 | 6.64 | 7.69 |
| Found | 72.47 | 6.65 | 7.81 |

36.4 Grams of the stilbene derivative obtained above was dispersed in 300 ml of concentrated hydrochloric acid. The mixture was stirred for 2 hours at 80° – 90°C and thereafter poured on 600 ml of ice water. The precipitates deposited were separated by filtration, washed with water until the filtrate became neutral, and dried. Thus, 26.0 g of 4'-N,N-dimethylcarbamoyl-4-(4,5-dimethyloxazol-2-yl)stilbene having the formula,

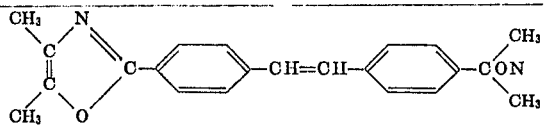

was obtained in the state of yellow crystalline powder. Yield: 75 percent, m.p.: 258° – 260°C (DMF).

| Elementary analysis | C (%) | H (%) | N (%) |
|---|---|---|---|
| Calculated (as $C_{22}H_{22}N_2O_2$) | 76.27 | 6.40 | 8.09 |
| Found | 76.30 | 6.37 | 8.01 |

The DMF solution of the product obtained exhibits blue strong fluorescence.

EXAMPLES 223–269

According to the method similr to that of Example 222, the following oxazolyl derivatives were obtained.

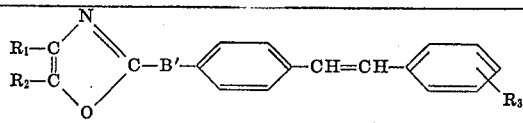

| Example No. | $R_1$ | $R_2$ | B' | $R_3$ | M.P. (° C.) | | Fluorescence in solvent | |
|---|---|---|---|---|---|---|---|---|
| 223 | H— | $CH_3$— | —CH=CH— | p-CN | 161-163 | (Aq. DMF) | Blue | (DMF) |
| 224 | $CH_3$— | $CH_3$— | —CH=CH— | H | 172-175 | (EtOH) | do | (DMF) |
| 225 | $CH_3$— | $CH_3$— | —CH=CH— | m-Cl | 178-180 | (EtOH) | do | (DMF) |
| 226 | H— | $CH_2$–$CH_2$–$CH_2$–$CH_2$–$CH_2$–CH— (cyclohexyl) | —CH=CH— | o-Cl | 122-126 | (Aq. EtOH) | do | (DMF) |
| 227 | H— | phenyl | —CH=CH— | p-$CH_3$ | 178-180 | (DMF) | Greenish blue | (DMF) |
| 228 | H— | Same as above | —CH=CH— | m-$CO_2H$ | >300 | (DMF) | do | (DMF) |
| 229 | H— | do | —CH=CH— | p-$CO_2C_2H_5$ | 230-232 | (DMF) | do | (DMF) |
| 230 | H— | Cl-phenyl | —CH=CH— | p-$CON(CH_3)_2$ | >300 | (DMF) | do | (DMF) |
| 231 | phenyl | phenyl | —CH=CH— | H | 230-233 | (DMF) | do | (DMF) |
| 232 | Same as above | $CH_3$-phenyl | —CH=CH— | p-Cl | 248-250 | (DMF) | do | (DMF) |
| 233 | H— | $CH_3$— | | H | 136-137 | (EtOH) | Blue | (DMF) |
| 234 | H— | $CH_3$— | | p-CN | 145-146 | (DMF) | do | (DMF) |
| 235 | $CH_3$— | $CH_3$— | | H | 157-160 | (EtOH) | Violet blue | (DMF) |
| 236 | $CH_3$— | $CH_3$— | | O—Cl | 151-153 | (EtOH) | do | (DMF) |
| 237 | $CH_3$— | $CH_3$— | | m-Cl | 162-163 | (EtOH) | do | (DMF) |
| 238 | $CH_3$— | $CH_3$— | | p-Cl | 170-171 | (EtOH) | Blue | (DMF) |
| 239 | $CH_3$— | $CH_3$— | | p-CN | 162-163 | (EtOH) | do | (DMF) |
| 240 | $CH_3$— | $CH_3$— | | p-$CONH_2$ | >300 | (DMF) | do | (DMF) |
| 241 | $CH_3$— | $CH_3$— | | p-$CON(CH_3)_2$ | 258-260 | (DMF) | do | (DMF) |
| 242 | $CH_3$— | $CH_3$— | | p-$CO_2H$ | >300 | (DMF) | do | (DMF) |
| 243 | $CH_3$— | $CH_3$— | | p-$CO_2C_2H_5$ | 128-130 | (EtOH) | do | (DMF) |
| 244 | $CH_3CH_2$— | $CH_3$— | | p-$CON(CH_3)_2$ | 190-192 | (DMF) | do | (DMF) |
| 245 | H— | cyclohexyl | | m-$CO_2H$ | >300 | (DMF) | do | (DMF) |
| 246 | H— | phenyl | | H | 155-156 | (DMF) | do | (DMF) |
| 247 | H— | Same as above | | p-$CH_3$ | 162-163 | (DMF) | do | (DMF) |
| 248 | H— | do | | p-Cl | 198-200 | (DMF) | do | (DMF) |
| 249 | H— | do | | p-CN | 166-168 | (EtOH) | do | (DMF) |
| 250 | H— | do | | p-$CO_2H$ | >300 | (DMF) | do | (DMF) |
| 251 | H— | do | | p-$CO_2C_2H_5$ | 215-216 | (DMF) | do | (DMF) |
| 252 | H— | do | | p-$CON(CH_3)_2$ | 240-242 | (DMF) | do | (DMF) |
| 253 | H— | do | | p-$CON(C_2H_5)_2$ | 231-233 | (DMF) | Greenish blue | (DMF) |
| 254 | H— | Cl-phenyl | | H | 176-178 | (DMF) | Blue | (DMF) |

| Example No. | R₁ | R₂ | B' | R₃ | M.P. (° C.) | Fluorescence in solvent |
|---|---|---|---|---|---|---|
| 255 | H— | Cl-⟨⟩- | | p-Cl | 200–202 (DMF) | Blue (DMF) |
| 256 | H— | Same as above | | p-OCH₃ | 147–149 (DMF) | ...do... (DMF) |
| 257 | H— | do | | p-CON(CH₃)₂ | 285–287 (DMF) | Greenish blue (DMF) |
| 258 | H— | do | | p-CO₂H | >300 (DMF) | Blue (DMF) |
| 259 | H— | CH₃O-⟨⟩- | | H | 183–185 (DMF) | ...do... (DMF) |
| 260 | H— | Same as above | | m-Cl | 162–164 (DMF) | ...do... (DMF) |
| 261 | H— | do | | p-Cl | 235–237 (DMF) | ...do... (DMF) |
| 262 | H— | do | | p-OCH₃ | 214–217 (DMF) | ...do... (DMF) |
| 263 | H— | do | | p-CON(CH₃)₂ | >300 (DMF) | Greenish blue (DMF) |
| 264 | CH₃— | ⟨⟩ | | m-CO₂H | >300 (DMF) | Blue (DMF) |
| 265 | CH₃— | Same as above | | p-NHCOCH₃ | >300 (DMF) | Greenish blue (DMF) |
| 266 | ⟨⟩ | do | | p-CONH₂ | >300 (DMF) | ...do... (DMF) |
| 267 | Same as above | CH₃-⟨⟩- | | p-OCH₃ | 213–215 (DMF) | ...do... (DMF) |
| 268 | do | CH₃O-⟨⟩- | | H | 244–245 (DMF) | ...do... (DMF) |
| 269 | do | Same as above | | p-NHCO-⟨⟩ | >300 (DMF) | ...do... (DMF) |

APPLICATION OF THE OXAZOLYL DERIVATIVE

EXAMPLE 270

Into a dispersion prepared by dispersing 0.025 part of a novel oxazolyl derivative having the formula,

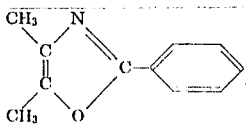

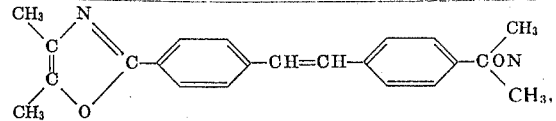

in 1,000 parts of water with 3 parts of Emulgen (Trademark of a nonionic surfactant produced by Kao Sekken K.K. in Japan), polypropylene cloth was dipped at a liquid ratio of 60:1. A period of 30 minutes was spent up to the boiling, which was kept for one hour. The dyed cloth was, thereafter, treated for 15 minutes at 90°C with a 3 g/liter aqueous solution of Monogen (Trademark of a higher alcohol sulfuric acid ester produced by Daiichi Kogyo Seiyaku K.K. in Japan), washed with water and dried. The cloth dyed was brilliant white. According to the same way as described above, the oxazolyl derivative dyed polyester, acetate, polyamide and the like in brilliant white.

Example 271

Into an aqueous dispersion consisting of 0.1 part of the oxazolyl derivative having the formula,

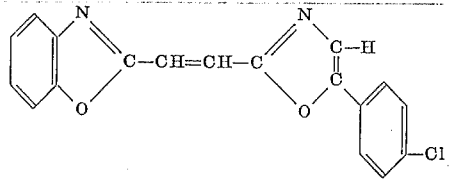

or

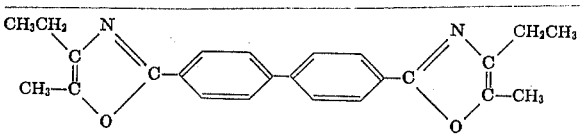

3 parts of Emulgen (Trademark of a nonionic surfactant produced by Kao Sekken K.K. in Japan), and 1,000 parts of water, polyester cloth was dipped, thereafter squeezed with a mangle to make the weight increased 80 percent and subjected to padding. The cloth was dried at 60°C and subjected to the thermosol treatment at 200°C for 30 seconds. Thus, the cloth whitened with extremely graceful appearance was obtained. According to the same way as described above, the oxazolyl derivative dyed acetate, polyethylene, nylon and the like in brilliant white.

Example 272

Into polypropylene resin melted at about 250°C, 0.01 percent by weight of the oxazolyl derivative having the formula, was added, and the mixture was sufficiently kneaded and subjected to spinning by means of the conventional method. Thus, the fiber optically whitened was obtained. On the one hand, 0.5 part of titanium dioxide was added further to the melt described above and the mixture was molded, thereby to obtain a molded article whitened extremely. According to the same way as described above, extremely whitened articles of ABS and polystyrene was obtained.

EXAMPLE 273

0.01 Part of the oxazolyl derivative having the formula,

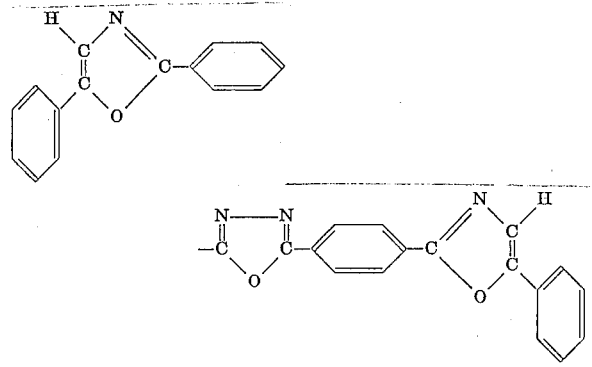

was mixed sufficiently with 100 parts of polyvinyl chloride (soft) pellet containing a plasticizer, a stabilizer and the like at 150°C in a mixing roll. The mixture was, thereafter, charged into a mold, a rolling or an extruder to form a desired article. The articles thus obtained had an extreme transparency.

On the other hand, one part of titanium dioxide was added further when mixing, thereby to obtain an article having extremely high whiteness.

What we claim is:

1. An oxazolyl derivative of the formula,

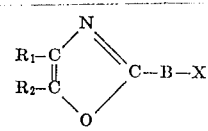

wherein B represents a member selected from the group consisting of

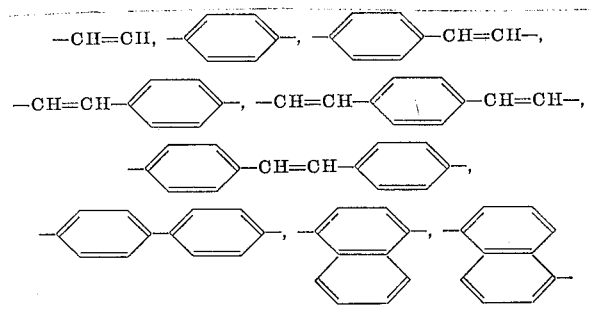

and

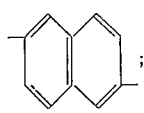

each of $R_1$ and $R_2$ represents a hydrogen atom, a $C_1$–$C_6$ alkyl, cyclopentyl, cyclohexyl, or a phenyl group which may be substituted by $C_1$–$C_6$ alkyl or $C_1$–$C_6$ alkoxy groups or halogen atoms, or $R_1$ and $R_2$ may be linked to each other to form cyclopentyl or cyclohexyl group together with two carbon atoms to which $R_1$ and $R_2$ are bonded, and may be the same or different; and X represents an oxazolyl group of the formula (II),

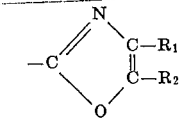

(II)

wherein $R_1$ and $R_2$ are the same as identified above provided that when B represents either

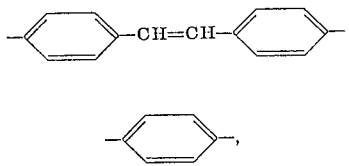

or

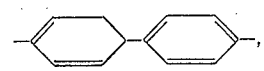

each of $R_1$ and $R_2$ represents a cyclopentyl, cyclohexyl, or $R_1$ and $R_2$ may be linked to each other to form a cyclopentyl or a cyclohexyl group together with the two carbon atoms to which $R_1$ and $R_2$ are bonded, and provided that when B is

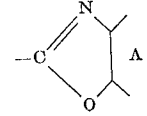

that $R_1$ and $R_2$ are not both phenyl or are not together phenyl and hydrogen and when B is —CH=CH—, $R_1$ and $R_2$ are not together phenyl and hydrogen, or an aryloxazolyl group of the formula (III),

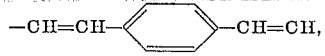

(III)

wherein A represents benzene or naphthalene nucleus which may be substituted by $C_1$–$C_6$ alkyl groups or halogen atoms, or when the bivalent group represented by B is

X represents an oxazolyl group of the formula (II), an aryloxazolyl group of the formula (III), or an aryl group of the formula (IV),

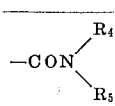

(IV)

wherein $R_3$ represents hydrogen or a halogen atom, $C_1$–$C_6$ alkoxy, cyano, hydroxycarbonyl, $C_1$–$C_6$ alkoxycarbonyl, a phenoxycarbonyl, a group of the formula, $$-CON\begin{matrix}R_4\\R_5\end{matrix}$$

or —NHOR$_6$ wherein each of R$_4$ and R$_5$ represents a hydrogen atom or C$_1$–C$_6$ alkyl group and R$_6$ represents a C$_1$–C$_6$ alkyl or a phenyl group or when the bivalent group represented by B is

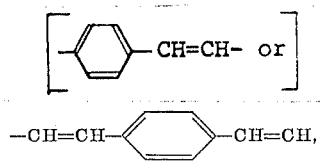

X represents an oxazolyl group of the formula (II), an aryloxazolyl group of the formula (III), or an aryl group of the formula (IV),

wherein R$_3$ represents cyano, hydroxycarbonyl, C$_1$–C$_6$ alkoxycarbonyl, a phenoxycarbonyl, a group of the formula,

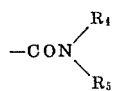

or —NHOR$_6$ wherein each of R$_4$ and R$_5$ represents a hydrogen atom or C$_1$–C$_6$ alkyl group and R$_6$ represents a C$_1$–C$_6$ alkyl or a phenyl group.

2. An oxazolyl derivative of claim 1, wherein X represents an oxazolyl group having the formula,

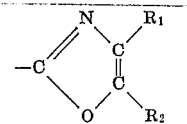

wherein each of R$_1$ and R$_2$ represents hydrogen atom, an C$_1$–C$_6$ alkyl or cyclopentyl or cyclohexyl group, or R$_1$ and R$_2$ are linked to each other to form a cyclopentyl or a cyclohexyl group together with two carbon atoms to which R$_1$ and R$_2$ are bonded provided that when B represents either

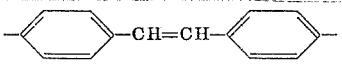

or

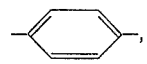

each of R$_1$ and R$_2$ represents a cyclopentyl, a cyclohexyl or R$_1$ and R$_2$ may be linked to each other to form a cyclopentyl or a cyclohexyl group together with the two carbon atoms to which R$_1$ and R$_2$ are bonded and provided that when B is

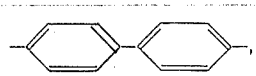

that R$_1$ and R$_2$ are not both phenyl or are not together phenyl and hydrogen and when B is —CH=CH—, R$_1$ and R$_2$ are not together phenyl and hydrogen.

3. A compound of the formula,

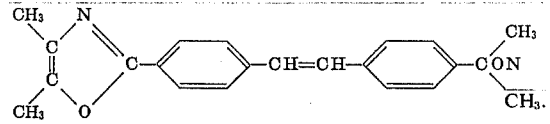

4. A compound of the formula,

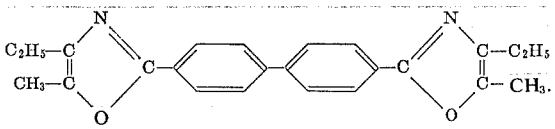

* * * * *